United States Patent [19]
White

[11] Patent Number: 5,285,331
[45] Date of Patent: Feb. 8, 1994

[54] SYSTEM FOR ALIGNING A READ HEAD GAP OVER A TRACK OF MAGNETIC DATA

[75] Inventor: Charles D. White, Simi Valley, Calif.
[73] Assignee: Wangtek Incorporated, Simi Valley, Calif.
[21] Appl. No.: 34,925
[22] Filed: Mar. 19, 1993

Related U.S. Application Data

[63] Continuation of Ser. No. 939,575, Sep. 3, 1992, abandoned, which is a continuation of Ser. No. 823,010, Jan. 15, 1992, abandoned, which is a continuation of Ser. No. 689,081, Apr. 19, 1991, abandoned, which is a continuation of Ser. No. 314,567, Feb. 23, 1989, abandoned.

[51] Int. Cl.⁵ .................... G11B 5/584; G11B 5/596
[52] U.S. Cl. ........................ 360/77.120; 360/77.07; 360/77.01; 360/77.06
[58] Field of Search ............... 360/77.01, 77.02, 77.07, 360/77.12, 77.13, 77.06

[56] References Cited

U.S. PATENT DOCUMENTS

| | | | |
|---|---|---|---|
| 3,246,307 | 4/1966 | Stanley | 360/77.06 |
| 3,425,047 | 1/1969 | Riggs | 360/77.02 |
| 3,918,091 | 11/1975 | Walraven et al. | 360/77.06 |
| 4,055,849 | 10/1977 | Hickok | 360/77.13 |
| 4,164,781 | 8/1979 | Brown | 360/77.06 |
| 4,204,234 | 5/1980 | Noble | 360/77.06 |
| 4,287,540 | 9/1981 | Cheatham et al. | 360/77.12 |
| 4,318,141 | 3/1982 | Haynes | 360/77.12 |
| 4,455,582 | 6/1984 | Yanagida et al. | 360/77.12 |
| 4,551,777 | 11/1985 | Saito et al. | 360/77.11 |
| 4,561,028 | 12/1985 | Guisinger | 360/77.04 |
| 4,581,663 | 4/1986 | Tanaka | 360/77.12 |
| 4,611,249 | 9/1986 | McClure | 360/77.01 |
| 4,633,344 | 12/1986 | Jeffers | 360/77.12 |
| 4,639,796 | 1/1987 | Solhjell | 360/77.12 |
| 4,647,992 | 3/1987 | Vinal | 360/77.01 |
| 4,652,945 | 3/1987 | Marchant | 360/77.01 |
| 4,670,800 | 6/1987 | McClure | 360/77.11 |
| 4,677,505 | 6/1987 | Nukada et al. | 360/77.12 |
| 4,866,548 | 9/1989 | Rudi | 360/77.12 |

FOREIGN PATENT DOCUMENTS

| | | | |
|---|---|---|---|
| 45-35155 | 10/1970 | Japan | 360/77.12 |
| 53-96805 | 8/1978 | Japan | 360/77.14 |
| 56-7229 | 1/1981 | Japan | 360/77.12 |
| 60-107724 | 6/1985 | Japan | 360/77.12 |
| 7514517 | 8/1976 | Netherlands | 360/77.12 |

OTHER PUBLICATIONS

IBM Technical Disclosure Bulletin, vol. 27, No. 9, Feb. 1985, Floppy Disk Servo System, E. G. Nassimbene, pp. 5117-5118.

Primary Examiner—David L. Robertson
Attorney, Agent, or Firm—Robbins, Berliner and Carson

[57] ABSTRACT

A track following system for maintaining a read gap substantially centered on a data track by moving the read gap perpendicular to the direction of the data track. This moving of the read gap is performed to compensate for any original misalignment between the read gap and data track and also to compensate for any wander or movement of the data track to a misaligned position with respect to the read gap. The write gap is used as a source of position information to keep the read gap correctly positioned over the data track. During a track following operation, the write gap circuitry is operatively connected to a track following circuit. Several samples of data signals received by the write gap are analyzed by the track following circuit. The track following circuit operates to compare a first sample of such data signals with a second sample. A positioning device moves the read gap in a direction determined from the result of this comparison and also from the last direction in which the read gap was moved.

20 Claims, 8 Drawing Sheets

SYSTEM FOR ALIGNING A READ HEAD GAP OVER A TRACK OF MAGNETIC DATA

This application is a continuation of Ser. No. 07/939,575, filed Sep. 3, 1992, now abandoned; which is a continuation of Ser. No. 07/823,010, filed Jan. 15, 1992, now abandoned; which is a continuation of Ser. No. 07/689,081, filed Apr. 19, 1991, now abandoned; which is a continuation of Ser. No. 07/314,567, filed Feb. 23, 1989, now abandoned.

BACKGROUND OF THE INVENTION

1. Field of the Invention

The present invention relates to a system for reducing data errors during the reading back of data recorded on a recording medium.

2. Related Art

As one skilled in the art will appreciate, systems for reducing data errors caused by a misalignment of the read head and the data track, are of great utility. With the variety of recording/reading devices (i.e., computers, tape players and the like) used in so many facets of today's society, the use of such error reducing systems can serve a valuable function in a wide range of contexts. Moreover, as technology advances and data tracks become smaller and smaller, it will become increasingly more difficult to recover data without such data errors occurring. This will be due, in part, to the wandering of the tape with respect to the head, and to the misalignment of the head and data tracks, for example, caused by thermal variations in the tape cartridge and the tape drive. The present invention may be used to reduce the error rate caused by these and other factors, so as to improve the overall performance and efficiency of the tape drive system.

Currently used methods for reducing data errors include the process whereby the read gap is moved over the assumed center of the data track and a read operation, for reading of data, is started. If a data error occurs, the tape is backed up and the data is reread. If the error is still present, then the tape head is moved up or down a few steps and the data is reread again. This process is repeated several times until either the data is reread without errors or a hard error is declared. The disadvantage of this method is that it takes time to back the tape up, move the head up or down, and reread the data, possibly several times to finally recover the data without errors.

SUMMARY OF THE INVENTION

The track following system of the present invention is designed to keep the read gap substantially centered on the data track by moving the read gap perpendicular to the direction of the data track. This moving of the read gap may be performed to compensate for any original misalignment between the read gap and data track, and also to compensate for wander or movement of the data track to a misaligned position with respect to the read gap.

According to an embodiment of the present invention, the write gap is used as a source of position information to keep the read gap correctly positioned over the data track. During a track following operation, the write gap circuitry is operatively connected to a track following circuit. Several samples of data signals received by the write gap are analyzed by the track following circuit. The track following circuit operates to compare a first sample of such data signals with a second sample. A positioning device moves the read gap in a direction determined from the result of this comparison and also from the last direction in which the read gap was moved.

BRIEF DESCRIPTION OF THE DRAWINGS

The detailed description of the invention will be made with reference to the accompanying drawings, wherein like numerals designate corresponding parts in the several figures.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles. The scope of the invention is best defined by the appended claims.

According to the following description, a reading/recording apparatus is assumed to include a reading/recording head having a read gap and a write gap. Movement of the head, therefore, results in movement of both the read and the write gap. Other embodiments, however, may include a read gap provided on a first head and a write gap provided on a second head which is operatively connected with the first head such that movement of one head, with respect to the reading medium, results in like movement of the other head.

The following description is of an embodiment of the present invention wherein a track following system is employed with a quarter inch tape drive which operates with a quarter inch tape cartridge. However, one of ordinary skill in the art will appreciate the applicability of the present invention with other data recording and/or data reading devices.

Presently, quarter inch tape drives are designed with the write gap width substantially equal to the width of the recorded data track and the read gap width either larger or smaller than the write gap width. This allows for a certain amount of tape wander and misalignment between the read gap and the data track. If the read gap was not perfectly aligned with the data track at the start of a reading operation, then the chances of the occurrence of data errors increases in proportion to the amount of tape wander over the tape guides.

Since the read gap, generally, is either larger or smaller than the write gap, the head can be moved in small steps with no ill effects to the recovery of data (when there is no decrease in signal amplitude in the read circuit). The write gap, however, is generally, the same width as the data track. Therefore, any small step of movement off of the data track will result in a loss of amplitude of any signal received across the write gap. By connecting the write gap to a read circuit, a deviation of alignment of the tape head with respect to the data track can be measured by monitoring the relative change in amplitude of the signal received at the write gap. In an embodiment of the present invention, this measured reduction in amplitude, along with the knowledge of the last direction moved by the head, can be used in a servo-loop system to maintain the read gap reasonably centered over the data track.

Figure 1:
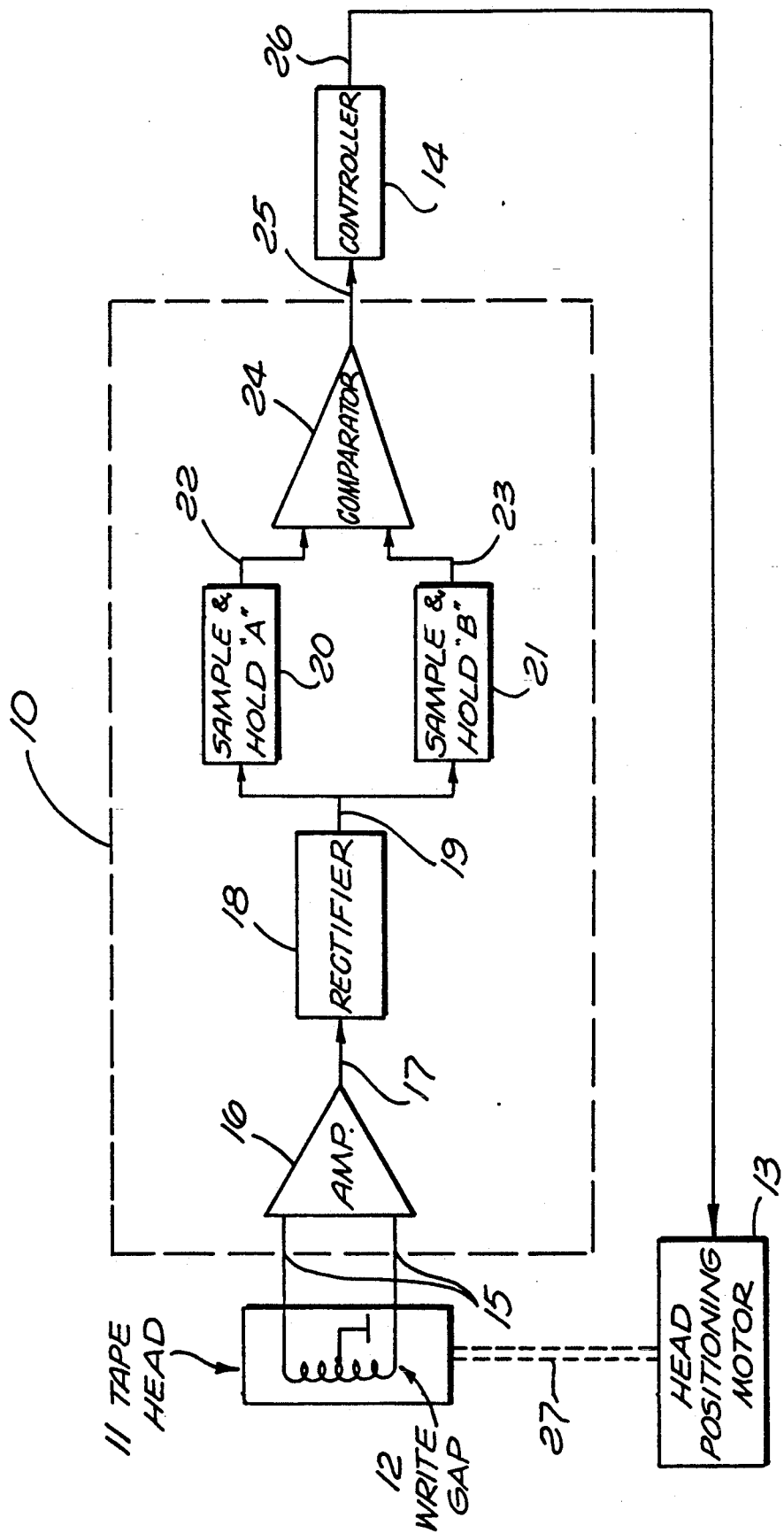
FIG. 1 shows a block diagram of a track following system according to an embodiment of the present invention.

In the track following system of the embodiment of FIG. 1, a track following circuit 10 operates with a tape head 11, a tape head positioning device 13, and a controlling device 14. The tape head 11 is provided with a write gap winding 12 of a write gap having a width substantially equal to the width of the data track. The head positioning device 13 may comprise, for example, a motor connected to the tape head 11 by a suitable connection linkage 27. The tape head positioning device 13 operates in response to a signal provided over a control line 26 to move the tape head 11 in either a first or a second direction perpendicular to the direction of a data track (not shown).

The controlling device 14 may comprise, for example, a microprocessor. An embodiment of a system for operating the controlling device (or microprocessor) 14 is shown in the flow chart of FIGS. 5-9. The controlling device 14 receives signals from the track following circuit 10 on the conductor 25. The controlling device 14 provides head positioning control signals on the control line 26 in response to signals received from the track following circuit 10 as discussed below.

As shown in FIG. 1, the track following circuit 10 is connected to receive signals from the write gap of the tape head 11, on the conductors 15. The signals received from the tape head 11 are amplified in an amplifier 16 which produces amplified signals on the conductor 17. The amplified signals are then rectified in a rectifier 18 which produces rectified voltage signals on the output conductor 19.

Two sample and hold circuits 20 and 21 are connected to the rectifier 18 so as to sample and hold the rectified voltage signals from the rectifier 18. The first sample and hold circuit 20 operates to sample and hold a first sample, called the "A sample", of the rectified voltage signals from the rectifier 18. The second sample and hold circuit 21 operates to sample and hold a second sample, called the "B sample", of the rectified voltage signal from the rectifier 18. The first and second sample and hold circuits 20 and 21 are connected to a comparator 24 by means of conductors 22 and 23, respectively.

The comparator 24 operates to compare the amplitude of the "A sample" with the amplitude of the "B sample". A signal representing the result of the comparison performed by the comparator 24 is supplied on the conductor 25 to the controlling device 14. As previously discussed, the controlling device 14 operates to control the head positioning device 13 in accordance with the signal provided on the conductor 25.

In operation, the tape drive is brought up to speed, the write gap of the tape head 11 is arranged adjacent a data track, and the tape drive is placed in a read mode. Signals received across the write gap by the write gap winding 12 are conducted on the conductors 15 to the amplifier 16. The amplifier 16 outputs an amplified signal which is supplied to the rectifier 18 by the conductor 17. The rectifier 18 provides a rectified output signal on the conductor 19. A controlling device, such as a microprocessor, then controls the sampling of the amplitude of the signal coming from the write gap. This amplitude sample, called the "A sample", is saved for a given amount of time. Thereafter, another sample is taken and called the "B sample". These two samples, "A sample" and "B sample", are then compared and a decision is made by the microprocessor, based upon the result of the comparison, as to which direction to move a head positioning motor. The information as to which direction the head positioning motor is moved, and which sample was last taken is saved for the next sample time. After enough time has elapsed so as to allow the head positioning motor to settle from the last move, another sample is taken to replace the oldest existing sample (in another embodiment, two new samples are taken). Since a "B sample" was last taken, a new "A sample" is taken. The system again compares the new "A sample" against the old "B sample" and determines which direction to move the head positioning motor. The direction of movement is determined by the microprocessor based upon the result of the last comparison and upon the last direction the head positioning motor was moved.

Figure 2:
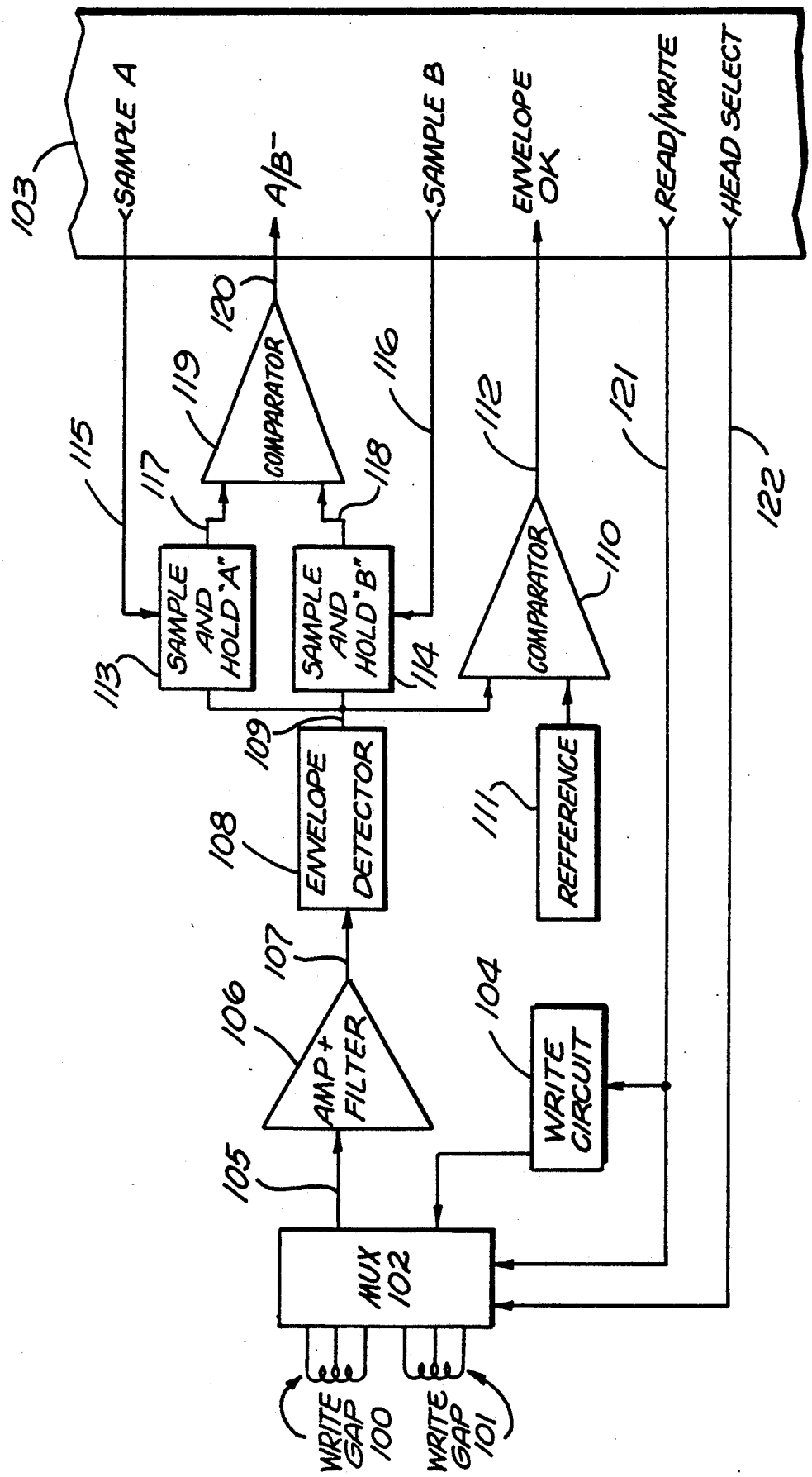
FIG. 2 shows a block diagram of a track following system according to another embodiment of the present invention.

The track following system of the FIG. 2 embodiment includes two write gap windings 100 and 101. The write gap windings 100 and 101 are connected to a multiplexer 102. The multiplexer 102 operates in response to a control signal provided on a control line 121 to connect at least one of the write gap windings to a write circuit 104 when the system is operated in a writing mode and to a track following channel 105 when the system is in a track following mode. The multiplexer 102 also operates in response to a control signal provided on the control line 122 to select the proper write gap winding when more than one write gap winding is provided on the head. The signal received by the write gap winding during a track following operation is supplied to an amplifier 106 which increases the amplitude of the received signal to a usable level. The amplifier 106 may be provided with a low pass filter to reduce unwanted noise in the received and amplified signal. The amplified and filtered signal is then supplied by a conductor 107 to an envelope detector 108 which produces a voltage signal, on the conductor 109, having an amplitude proportional to the amplitude of the signal supplied by the conductor 107.

The voltage signal on the conductor 109 is then supplied to three different circuits 110, 113 and 114. The first of these circuits is a voltage comparator 110 which operates to detect whether there is an adequate signal amplitude to enable track following. The comparator 110 compares the amplitude of the voltage signal on the conductor 109 with a predetermined reference value 111. The output signal of the comparator 110 is supplied via the conductor 112 to the microprocessor 103. The microprocessor then selectively enables the track following system in accordance with the signal supplied on the conductor 112. For example, if the signal supplied on the conductor 112 reflects that the voltage signal supplied by the conductor 109 has a greater amplitude than the reference value 111, then the track following system is enabled.

The voltage signal on the conductor 109 is also sent to two sample and hold circuits, called the "A sample" circuit 113 and the "B sample" circuit 114. The sample rate and duration for both sample and hold circuits 113 and 114 are controlled by the microprocessor 103 through the control lines 115 and 116, respectively. The output signals of the "A sample" and "B sample" circuits 113 and 114 are supplied by conductors 117 and 118, respectively, to a comparator 119. The comparator 119 determines which of the signals on the conductors 117 and 118 is of greater amplitude. The output of the comparator will be a logic high signal, for example, if the "A sample" is greater than the "B sample" and a logic low signal if the "A sample" is less than the "B sample". The output signal of the comparator 119 is provided by the conductor 120 to the microprocessor 103 to be used in determining which direction to move the head positioning motor (not shown in FIG. 2).

Figure 4:
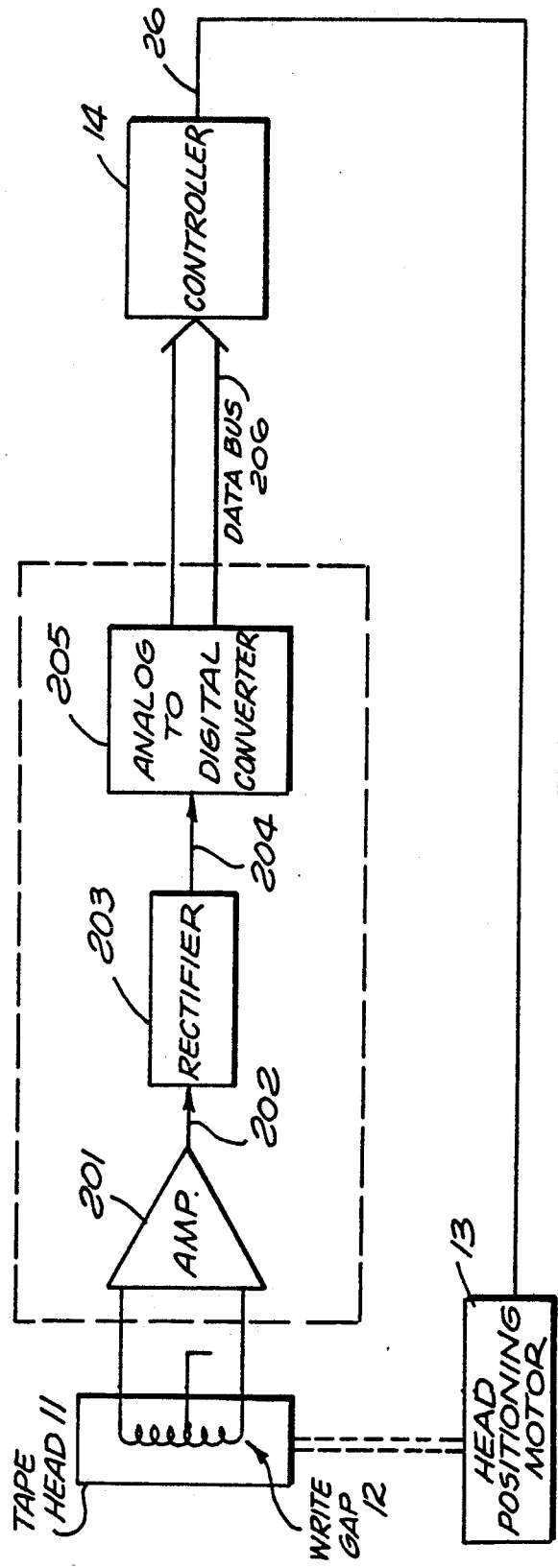
FIG. 4 shows a block diagram of a track following system according to yet another embodiment of the present invention.
Figure 5:
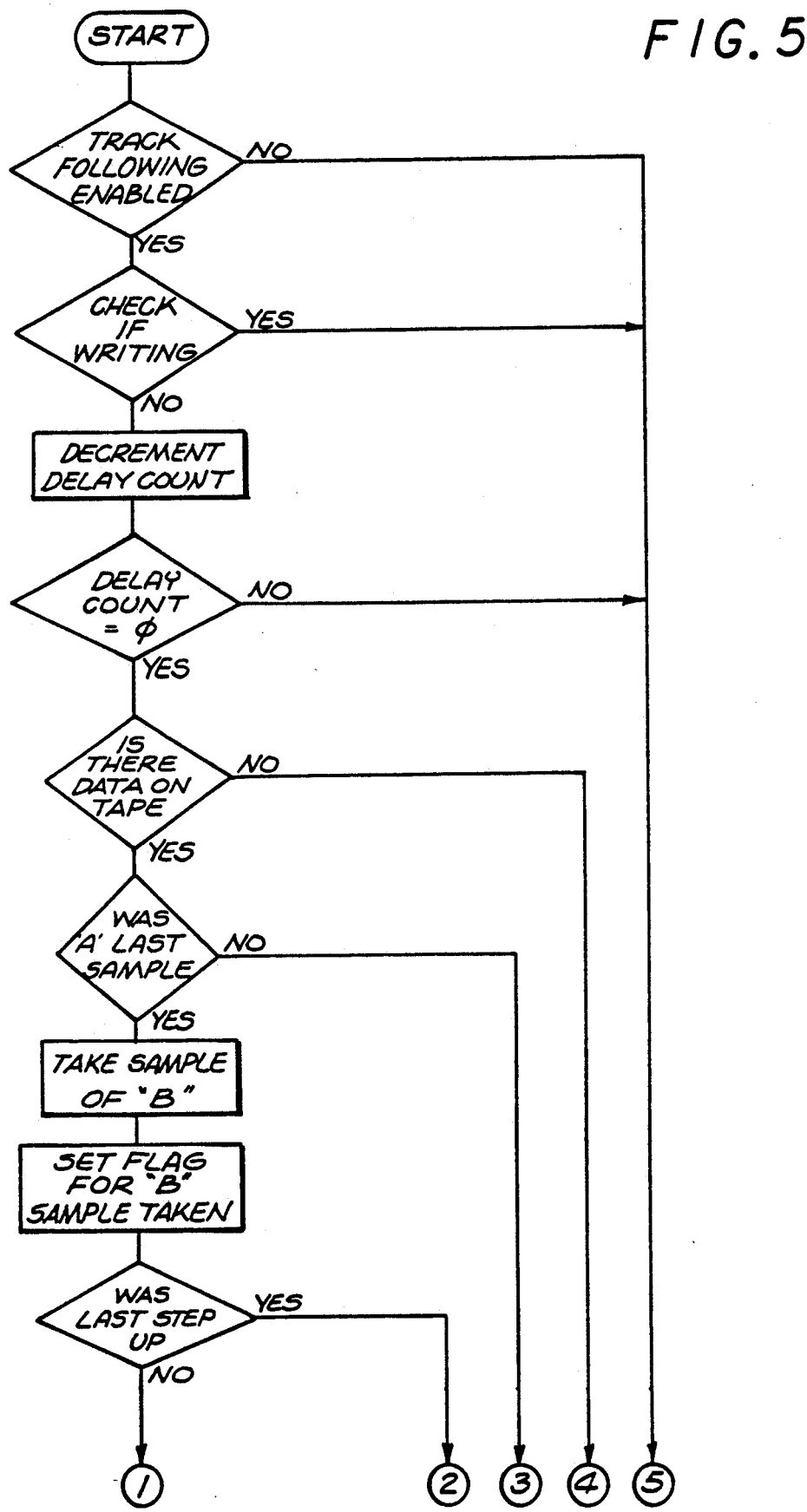
FIG. 5 through FIG. 9 show a flow diagram of the operation of the track following circuit controlling device according to an embodiment of the present invention.
Figure 6:
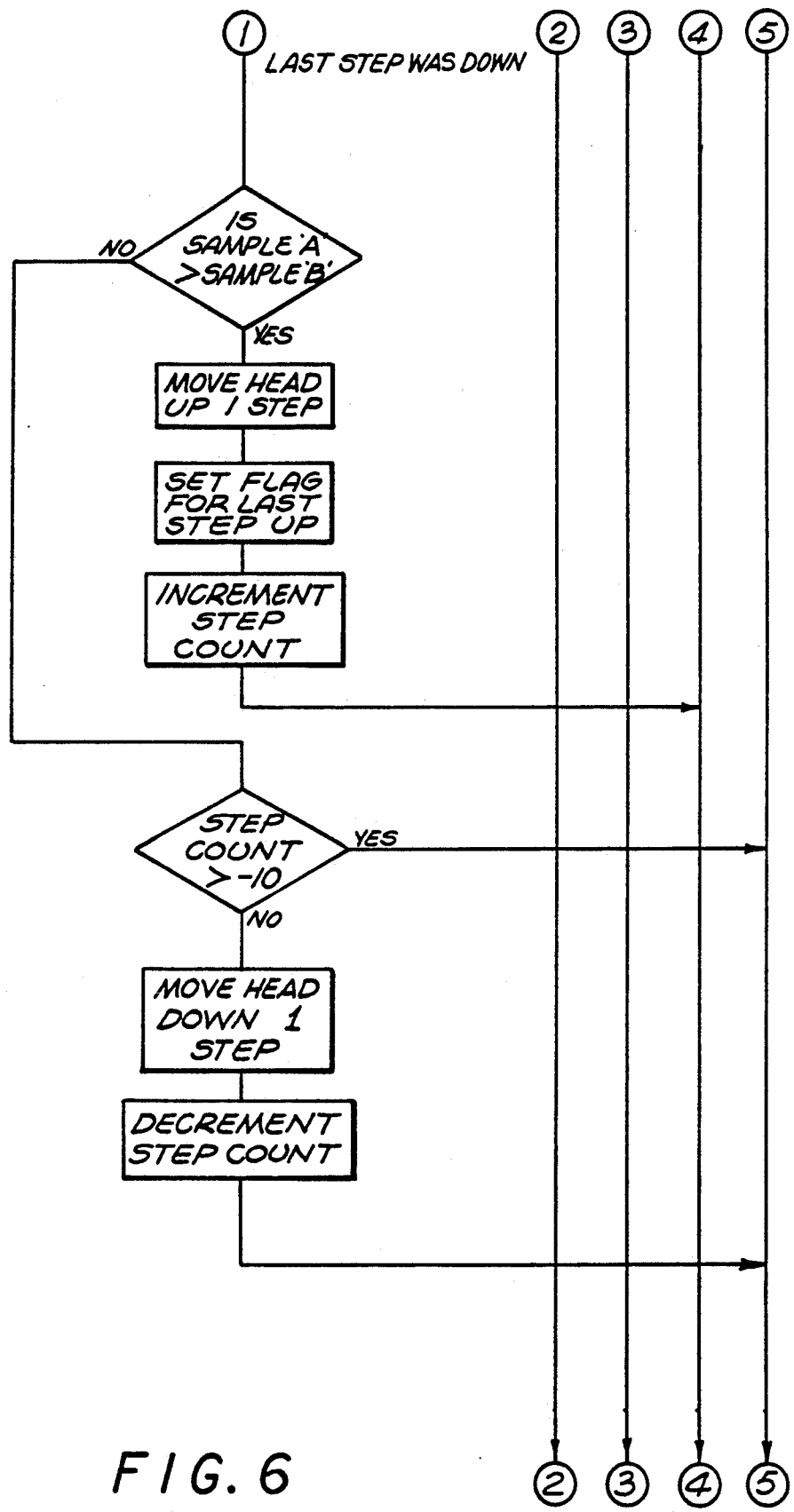
Figure 7:
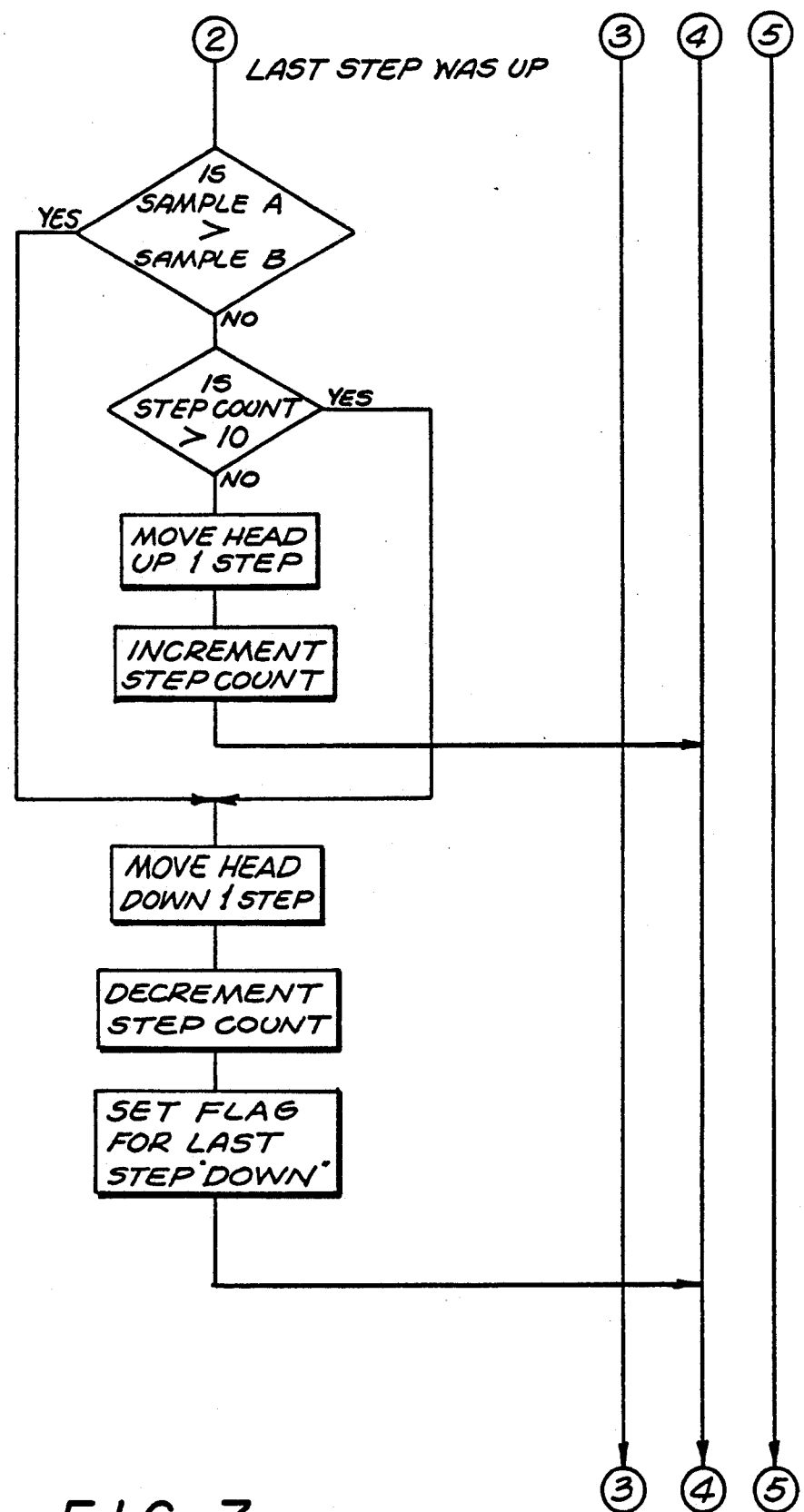
Figure 8:
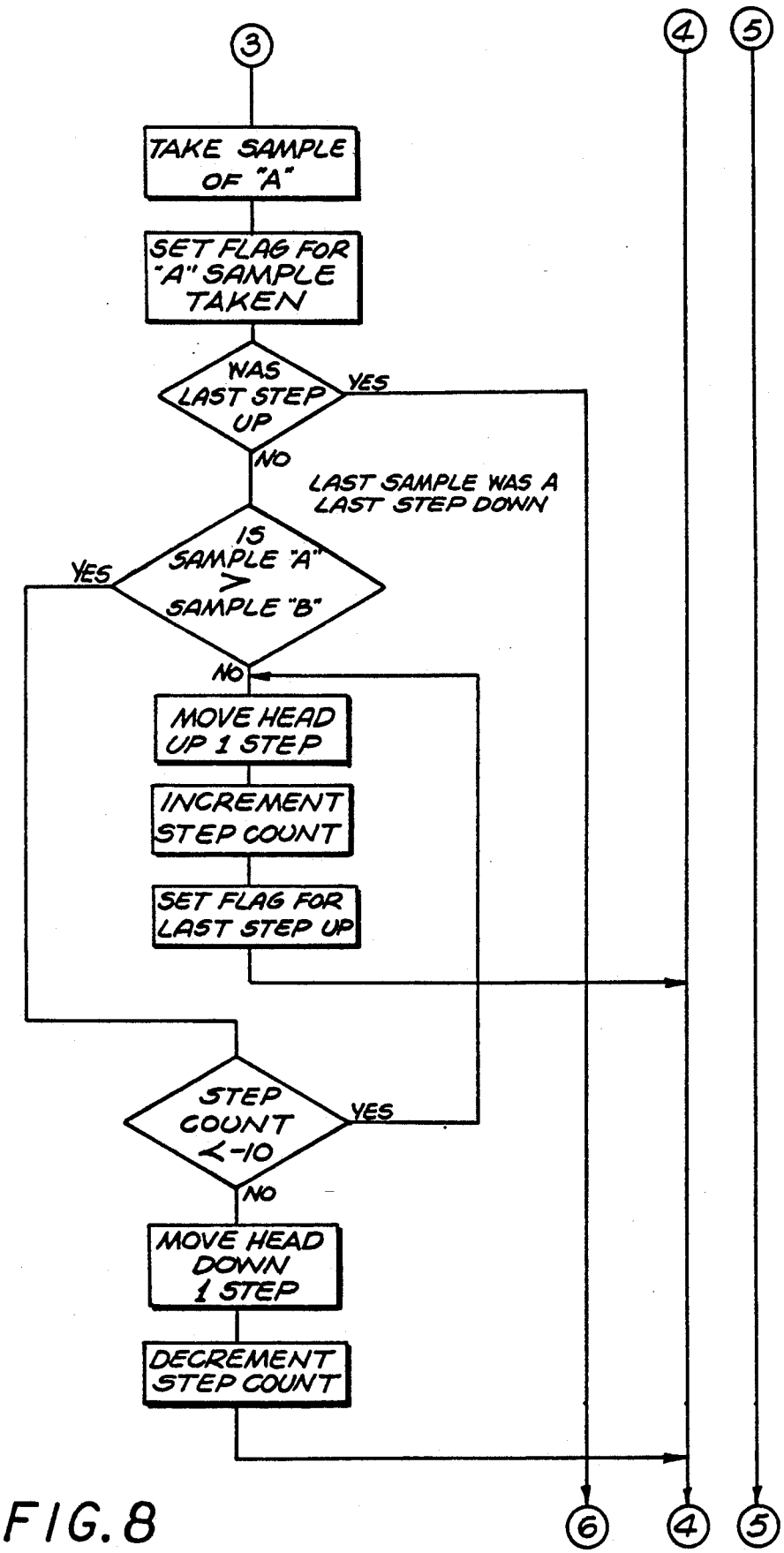
Figure 9:
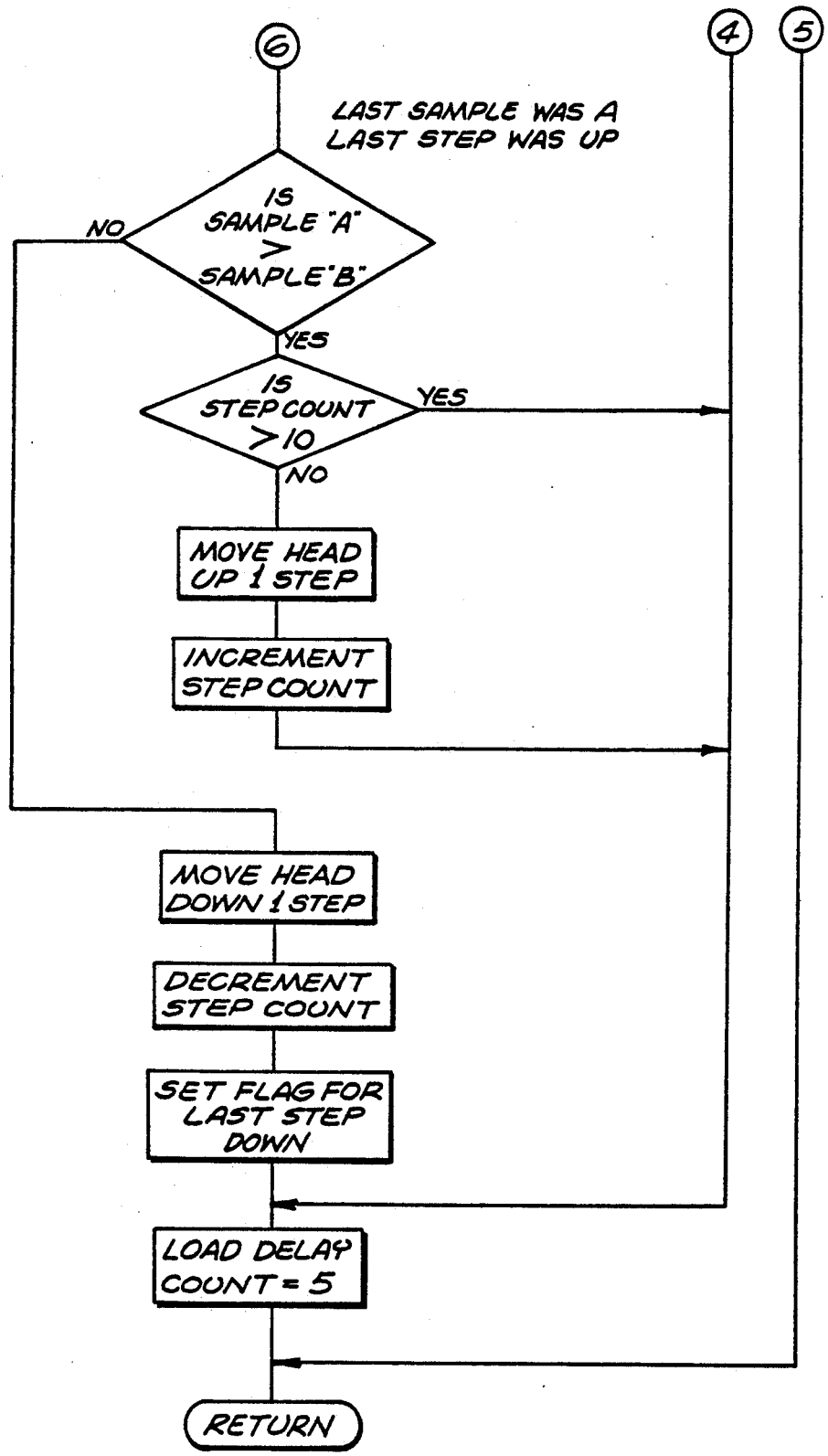

In another embodiment, an analog to digital converter could be used instead of the two sample and hold circuits. In this embodiment, the microprocessor takes a sample value from the analog to digital converter and saves the sample value in a memory for later use. This embodiment is shown in FIG. 4 wherein elements similar to those of the FIG. 1 embodiment are labeled accordingly. In FIG. 4, the track following circuit 200 receives signals from the write gap winding 12. An amplifier 201 provides an amplified signal on the conductor 202. A rectifier 203 rectifies the amplified signal and provides a rectified signal on the conductor 204. The rectified signal is then supplied to an analog to digital converter 205 which then supplies a digital signal on the data bus 206 to the controller 14. The controller 14 may comprise a microprocessor.

According to the embodiments illustrated in FIGS. 2 and 4, the actual process of track following begins after the tape drive is up to speed, the tape drive is in the read mode, and the read gap on the head is positioned over the data track. When the track following system is enabled, the write gap is disconnected from the write circuit and is connected to a separate read channel dedicated to track following. A controlling device, such as a microprocessor, then controls the sampling of the amplitude of the signal coming from the write gap. This amplitude sample, called the "A sample", is saved for a given amount of time. Thereafter, another sample is taken and called the "B sample". These two samples, "A sample" and "B sample", are then compared and a decision is made by the microprocessor, based upon the result of the comparison, as to which direction to move a head positioning motor. The information as to which direction the head positioning motor is moved, and which sample was last taken is saved for the next sample time. After enough time has elapsed so as to allow the head positioning motor to settle from the last move, another sample is taken to replace the oldest existing sample (in another embodiment, two new samples are taken). Since a "B sample" was last taken, a new "A sample" is taken. The system again compares the new "A sample" against the old "B sample" and determines which direction to move the head positioning motor. The direction of movement is determined by the microprocessor based upon the result of the last comparison and upon the last direction the head positioning motor was moved. (An example of a system for operating the controlling device, microprocessor, is shown in the flow chart of FIGS. 5-9.) This process may be repeated continuously, with a fixed delay between moving the head positioning motor and taking the next sample so as to allow the motor to settle. According to these embodiments of the present invention, the head positioning motor is always moved a minimum distance each sample, even if the two samples are the same amplitude.

An embodiment of a system of operation of the controlling device (or microprocessor) is shown in the flow chart of FIGS. 5-9. According to this system, when the track following routine is entered, a determination is made of whether a track following routine has been enabled. For example, the track following routine may not be enabled if the drive was reading a tape with different track widths or if it was searching for a reference burst. If not enabled, then the flow returns to the calling routine. Next the drive is checked to insure that it is not in a write mode. If it is, the flow may return to the calling routine. The delay counter is then decremented and checked for zero. If not zero, the flow returns to the calling routine again. Next, a check is made of whether there is data on the track with sufficient amplitude for the track follower circuit to work. This is done, for example, by monitoring the output of the comparator 110 of FIG. 2. If the amplitude is insufficient, then flow returns to the calling routine.

The system for moving the motor includes two major paths that can be taken, depending if the "A sample" or "B sample" was the last sample taken. Only the flow for the "A sample" being the last sample taken will be followed in this description, since the flow for the "B sample" is the same except the conditional branches are reversed. Since the "A sample" was the last sample, a "B sample" is first taken. A flag is then set to indicate that the "B sample" is now the last sample taken and an "A sample" should be taken next. A flag indicates which direction the motor was moved last. If the motor was stepped down last, the flow follows "flow 1" and if the last step was up, the flow follows "flow 2".

Following "flow 1", the A/B— line is checked to see if the old "A sample" is greater or less than the new "B sample". If the "A sample" was greater, then the controlling device determines that the head is moving in the wrong direction and the motor should be moved up one increment or step. Since the head is moved up, a flag must be set to indicate that up was the last direction taken. The system also keeps track of the number of steps the head is from the starting point. This value will be positive for steps above the starting point and negative for steps below. In this flow a step up was taken, so the step counter is incremented. If the "B sample" was greater than the "A sample" in "flow 1" then the system would first check that the step counter was not at the negative limit. If not, then the motor moves the head down one step or increment and the step counter is decremented. Both of the paths in "flow 1" then jump to the end of the routine to reload the delay counter with 5 and return to the calling routine.

If "flow 1" was not followed, then the last step was up and "flow 2" will be taken. Next the A/B— line is checked to see if the old "A sample" is greater or less than the new "B sample". If "B sample" was greater, then the head is moving in the right direction. The system first checks that the step counter is not greater than the limit. If not, then the head is moved up and the step counter is incremented. If the "A sample" was greater than the "B sample" then the head is moving in the wrong direction. The motor then moves the head down one step or increment and the step counter is decremented. Since the motor direction was changed, a flag must be set to indicate that the last direction was down. Both of the paths in "flow 2" then jump to the end of the routine to reload the delay counter and return to the calling routine.

During ramp down of the capstan motor, the track following routine will move the head back to where it was prior to the start of track following. Prior to ramp up, all flags will be cleared, and the delay counter will be loaded with a large value so that track following is not performed until the tape speed is stable.

Figure 3A:
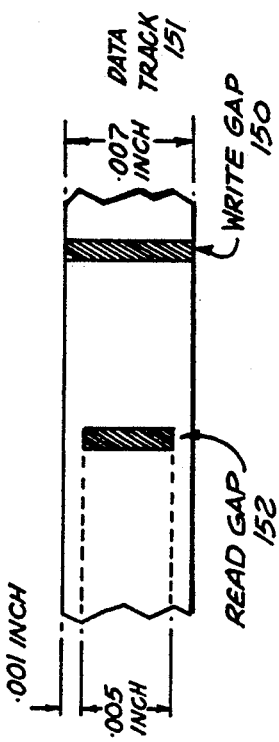
FIG. 3a shows a diagram of the relative width of a read gap, write gap a track, according to an embodiment of the present invention.
Figure 3B:
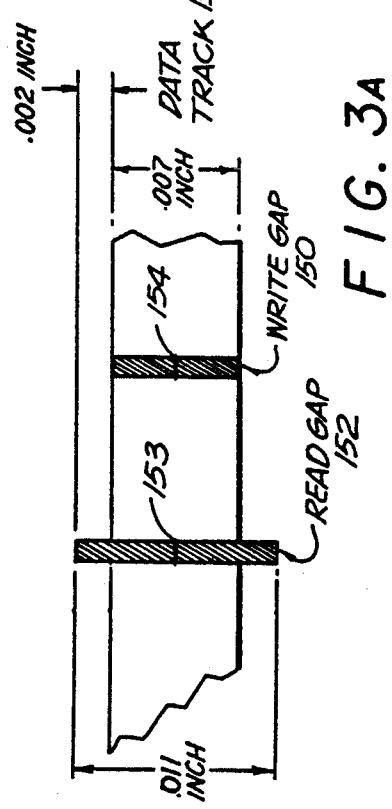
FIG. 3b shows another diagram of the relationship between the widths of a read gap, write gap and data track according to another embodiment of the present invention.

The present invention may be used on a system where the read gap is larger (FIG. 3a) or smaller (FIG. 3b) than the write gap. In the FIG. 3a example, the write gap 150 and the data track 151 are shown as being 7 milli-inches wide and the read gap 152 is shown as being 11 milli-inches wide. In order to read data properly, the center line 153 of the read gap 152 must be within $+/-1$ milli-inch of the write gap center line 154. The motor driving the head (i.e., device 13 of FIG. 1) may comprise, for example, an open loop stepper motor which moves the head 0.372 milli-inches per step. Using nominal values, it can be seen that the read gap can be off of the track by $+/-2$ milli-inches or $+/-1$ milli-inch if the center line offset is taken into account, and still recover data correctly. The $+/-1$ milli-inch margin allows the stepper motor to dither the head about the data track as the track following operation is performed. Since the track following circuit can be easily confused by noise, drop outs, and preamble gaps (due to the resolution of the head), the two to three steps of margin provides the track following system with adequate time to recover.

The track following systems described above may also be used with a single gap head having separate read and write windings instead of the dual gap head described above.

In other embodiments, a sequencer or a controller could be used to control the track following process instead of a microprocessor. Furthermore, head moving devices other than a stepper motor could be used to move the head. For example, any type of motor (three-phase brushless D.C., voice coil, brush D.C., linear, or the like) could be used in an open loop system or closed loop servo system using a position encoder for feedback. In other embodiments, the track following process may be operated during a write mode, where one write gap winding operates with the track following circuit and a second write gap winding operates with a write circuit.

The disclosed embodiments are to be considered in all respects as illustrative and not restrictive, the scope of the invention being indicated by the appended claims, rather than the foregoing description. All changes which come within the meaning and range of equivalency of the claims are intended to be embraced therein.

What is claimed is:

1. A system for reading data recorded on a magnetic recording medium, said system comprising:
   a read head gap for reading data signals on a data track on the magnetic recording medium;
   a write head gap for writing data signals on a data track on the magnetic recording medium, the write head gap having a width substantially equal to the data track and detecting the data signals on a data track when the read head gap is reading the data signals on the data track, the write head gap being operatively connected with the read head gap such that movement of one head, with respect to the data track, results in movement of the other head;
   a means for moving the read head gap perpendicular to the data track;
   a track following circuit operable to receive data signal on the track detected by the write head gap; and
   a controlling device operably connected with the track following circuit, for controlling the moving means in response to the data signals received from the write head gap;
   whereby the read head gap remains aligned with the data track as the read head gap reads data signals on the data track.

2. A system as claimed in claim 1, wherein the track following circuit is operable to receive a first sample and a second sample of data recorded on the recording medium and detected by the write gap, and wherein the track following circuit includes comparing means for comparing the first sample of data and the second sample of data.

3. A system as claimed in claim 2, wherein the controlling device comprises a operating means for operating the moving means in response to the result of the comparison performed by the comparing means.

4. A system as claimed in claim 2, wherein the moving means comprises a motor operable to move the read head gap in stepped increments in a first direction and in a second direction opposite to the first direction.

5. A system as claimed in claim 4, wherein the track following circuit further includes memory means for storing data representative of the last direction in which the motor moved the read head gap, and wherein the controlling device controls the moving means in accordance with the comparison performed by the comparing means and the last direction stored by the memory means.

6. A system as claimed in claim 1, wherein:
   the write gap is operable to receive a first sample of data and a second sample of data recorded on the recording medium;
   the track following circuit includes signal producing means for producing a first voltage signal corresponding to the first sample of data and a second voltage signal corresponding to the second sample of data; and
   the track following circuit further includes a comparing means for comparing the amplitude of the first voltage signal and the amplitude of the second voltage signal.

7. A system as claimed in claim 6, wherein the controlling device comprises a processing means for operating the moving means in response to the result of the comparison performed by the comparing means.

8. A system as claimed in claim 1, wherein:
   the write gap is operable to receive data recorded on the recording medium;
   the track following circuit includes first and second sampling means for respectively receiving a first and second sample of the data received by the write gap, the track following circuit further includes a comparing means for comparing the first and second samples of data received by the first and second sampling means, respectively; and
   the controlling device includes operating means for operating the moving means in response to the result of the comparison performed by the comparing means.

9. A system as claimed in claim 8, wherein the operating means include sample control means for controlling the sampling rate and sample duration of the sampling means.

10. A system as claimed in claim 1, wherein:
the write gap is operable to receive data recorded on the recording medium;
the track following circuit includes track following enabling means, operable with the write gap, for comparing the data received by the write gap with a reference value and for enabling the track following circuit in response to the comparison.

11. A system, operable with a recording head positioning device and a recording head having a read gap for reading a track of data and a write gap for writing a track of data, for controlling the positioning of the read gap with respect to a track of data recorded on a recording medium, said system having a track following circuit comprising:
selective control means operable in a first mode for controlling the write gap to receive data from the track recorded on the recording medium and to provide a signal from the track data, the signal dependent upon the position of the write gap with respect to the track of data;
a voltage signal producing means operatively connected with the write gap, for producing a voltage signal having an amplitude dependent upon the signal;
sampling means for receiving a first sample and a second sample of the voltage signal;
first comparing means, operatively connected with the sampling means for comparing the amplitude of the first sample and the amplitude of the second sample;
positioning control means operatively connected with comparing means, for controlling the recording head positioning device in response to the comparison performed by the first comparing means.

12. A system as claimed in claim 11, further comprising a second comparing means, operatively connected with the voltage signal producing means, for comparing the amplitude of the voltage signal with a reference value and for providing an enabling signal upon the voltage signal exceeding the reference value.

13. A system as claimed in claim 12, wherein the positioning control means is operable to receive the enabling signal and wherein the positioning control means operates in response to the enabling signal to selectively enable the track following circuit.

14. A system as claimed in claim 12, wherein the sampling means comprises first and second sample and hold circuits and wherein the positioning control means is operatively connected with the first and second sample and hold circuits and includes sampling controlling means for controlling the sampling rate and duration of the first and second sample and control circuits.

15. A system as claimed in claim 12, further comprising a write circuit operatively connected with the selective control means, wherein the selective control means is operable in a second mode for controlling the write gap to be operatively connected with the write circuit.

16. A system as claimed in claim 15, wherein the positioning control means is operatively connected with the selective control means and controls the mode in which the selective control means operates.

17. A system as claimed in claim 12, wherein the recording head positioning device comprises a motor operable to move the head in stepped increments in a first direction and in a second direction opposite to the first direction, wherein the first and second directions are substantially perpendicular to the track of data recorded on the recording medium.

18. A system as claimed in claim 17 wherein the track following circuit further includes memory means for storing data representing the last direction in which the motor moved the head and wherein the positioning control means controls the recording head positioning device in accordance with the comparison performed by the first comparing means and the last direction stored by the memory means.

19. In a system operable with a tape head having a read gap for reading a track of data and a write gap for writing a track of data, the write gap positioning the read gap with respect to a track of data recorded on a recording medium, a method of system operation comprising the steps of:
receiving data with the write gap from the track recorded on the recording medium; and
moving the read gap in a direction substantially perpendicular to the track of data in response to the data received from the write gap;
whereby the read gap is aligned with the track of data.

20. A system for reading data signals recorded on a magnetic recording medium, said system comprising:
a first head gap for reading data signals on a data track on the magnetic recording medium;
a second head gap for writing data signals on a data track on the magnetic recording medium, the second head gap detecting the data signals on the data track when the first head gap is reading the data signals on the data track and having a width substantially as wide as the data track, the second head gap being operatively connected with the first head gap such that movement of one head, with respect to the data track, results in movement of the other head;
a means for moving the first head gap perpendicular to the data track;
a track following circuit responsive to amplitudes of data signals on the track detected by the second head gap; and
a controlling device operably connected with the track following circuit, for controlling the moving means in response to the amplitudes of data signals received from the second head gap;
whereby the first head gap remains aligned with the data track as the first head gap reads data signals on the data track.

* * * * *

UNITED STATES PATENT AND TRADEMARK OFFICE
CERTIFICATE OF CORRECTION

PATENT NO. : 5,285,331
DATED : February 8, 1994
INVENTOR(S) : White

It is certified that error appears in the above-indentified patent and that said Letters Patent is hereby corrected as shown below:

Col. 2, line 19, "gap a track," should be --gap and data track--.

Col. 8, line 8, "signal" should be --signals--.

Col. 10, line 50, "a means for moving" should be --a moving means for--.

Signed and Sealed this

Twenty-sixth Day of July, 1994

Attest:

BRUCE LEHMAN

*Attesting Officer*     *Commissioner of Patents and Trademarks*